United States Patent [19]

Murata et al.

[11] Patent Number: 5,428,680
[45] Date of Patent: Jun. 27, 1995

[54] DTMF SIGNAL RECEIVING APPARATUS EQUIPPED WITH A DTMF SIGNAL JUDGING CIRCUIT

[75] Inventors: Yasumoto Murata; Michio Ikeuchi; Shuichi Yoshikawa, all of Nara, Japan

[73] Assignee: Sharp Kabushiki Kaisha, Osaka, Japan

[21] Appl. No.: 102,009

[22] Filed: Aug. 4, 1993

[30] Foreign Application Priority Data

Aug. 7, 1992 [JP] Japan .................................. 4-211844

[51] Int. Cl.6 ............................................. H04M 1/50
[52] U.S. Cl. .................................... 379/386; 379/387; 379/372; 379/88; 379/89
[58] Field of Search ................... 379/386, 387, 372, 88, 379/89

[56] References Cited

U.S. PATENT DOCUMENTS

| | | | |
|---|---|---|---|
| 4,085,295 | 4/1978 | Goto et al. | 379/386 |
| 4,395,595 | 7/1983 | Nishitani et al. | 379/386 |
| 4,599,495 | 7/1986 | Richards | 379/386 |
| 4,922,528 | 5/1990 | Hubert et al. | 379/386 |
| 5,172,406 | 12/1992 | Locke | 379/88 |
| 5,214,693 | 5/1993 | Chujo | 379/386 |

Primary Examiner—James L. Dwyer
Assistant Examiner—Jacques M. Saint-Surin

[57] ABSTRACT

A DTMF signal receiving apparatus includes a DTMF signal receiver; and a DTMF signal judging circuit. The DTMF signal receiver includes an input section for receiving an input signal from an external apparatus; a plurality of first band-pass filters connected to the input section; a plurality of second band-pass filters connected to the input section; and an output section connected to the plurality of the first band-pass filters and the plurality of the second band-pass filters, for outputting a code based on a plurality of outputs from the plurality of the first band-pass filters and the plurality of the second band-pass filters. The DTMF signal judging circuit includes a first judging device connected to the plurality of the first band-pass filters, for outputting a first judgment signal based on a plurality of first outputs from the plurality of the first band-pass filters; a second judging device connected to the plurality of the second band-pass filters, for outputting a second judgment signal based on a plurality of second outputs from the plurality of the second band-pass filters; and a third judging device for judging whether the input signal is a DTMF signal or not based on the first judgment signal and the second judgment signal and for permitting the output section to output the code when judging that the input signal is a DTMF signal.

9 Claims, 4 Drawing Sheets

DTMF SIGNAL RECEIVING APPARATUS EQUIPPED WITH A DTMF SIGNAL JUDGING CIRCUIT

BACKGROUND OF THE INVENTION

1. Field of the Invention

The present invention relates to a dual tone multifrequency (hereinafter, referred to as DTMF) signal receiving apparatus equipped with a DTMF signal judging circuit for judging whether a signal inputted into a facsimile apparatus, a multi-function telephone or the like is a DTMF signal or not.

2. Description of the Related Art

A DTMF signal is used, for example, for transmitting a phone number or the like from a pushbutton telephone to a telephone central office. A DTMF signal includes one of four tones each having a frequency in a low frequency band and one of four tones each having a frequency in a high frequency band.

In general, the following frequencies are allocated for four tones in the low frequency band: fa=697 Hz; fb=770 Hz; fc=852 Hz; and fd=941 Hz.

For four tones in the high frequency band, the following frequencies are allocated: fe=1209 Hz; ff=1336 Hz; fg=1477 Hz; and fh=1633 Hz.

For example, a DTMF signal indicating the numeral "1" of a phone number includes a tone having a frequency of 697 Hz (low frequency) and a tone having a frequency of 1209 Hz (high frequency).

Since such a DTMF signal is also used for transmitting data after a line connection, some facsimile apparatuses or some multi-function telephones connected to a public telephone network are equipped with a DTMF signal receiver.

FIG. 4 is a block diagram of a conventional DTMF signal receiver. The DTMF signal receiver includes eight band-pass filters 110 to 117, which are all connected to an input terminal 100. The band-pass filters 110 to 117 correspond to the above-mentioned eight tones (four having a low frequency and four having a high frequency), respectively. The frequency of each of the eight tones corresponds to a center frequency of a passband of the corresponding band-pass filter.

The band-pass filters 110 to 117 extract frequency components of a signal inputted into the input terminal 100, the frequency components corresponding to the eight tones, respectively.

The band-pass filters 110 to 117 are connected to multipliers 120 to 127, respectively, for squaring outputs from the band-pass filters 110 to 117. The multipliers 120 to 127 are connected to smoothing low-pass filters 130 to 137 for smoothing outputs from the multipliers 120 to 127. The low-pass filters 130 to 137 are connected to level detectors 140 to 147 for detecting power levels of outputs from the smoothing low-pass filters 130 to 137. The level detectors 140 to 147 are all connected to a coder 150 for outputting a code based on outputs from the level detectors 140 to 147.

In such a conventional DTMF signal receiver, when a signal which is not a DTMF signal but includes at least one frequency component identical with one of the DTMF frequency components, for example, an audio signal or white noise is inputted, such a signal is erroneously recognized as a DTMF signal. Thus, the DTMF signal receiver malfunctions and a system using the DTMF signal receiver is abnormally operated.

SUMMARY OF THE INVENTION

A DTMF signal receiving apparatus according to the present invention includes a DTMF signal receiver; and a DTMF signal judging circuit. The DTMF signal receiver includes an input section for receiving an input signal from an external apparatus; a plurality of first band-pass filters connected to the input section; a plurality of second band-pass filters connected to the input section; and an output section connected to the plurality of first band-pass filters and the plurality of second band-pass filters, for outputting a code based on a plurality of outputs from the plurality of first band-pass filters and the plurality of second band-pass filters. The DTMF signal judging circuit includes first judging means connected to the plurality of first band-pass filters, for outputting a first judgment signal based on a plurality of first outputs from the plurality of first band-pass filters; second judging means connected to the plurality of second band-pass filters, for outputting a second judgment signal based on a plurality of second outputs from the plurality of second band-pass filters; and third judging means for judging whether the input signal is a DTMF signal or not, based on the first judgment signal and the second judgment signal and for permitting the output section to output the code when judging that the input signal is a DTMF signal.

Alternatively, a DTMF signal receiving apparatus according to the present invention includes a DTMF signal receiver; and a DTMF signal judging circuit. The DTMF signal receiver includes an input section for receiving an input signal from an external apparatus; a plurality of first band-pass filters connected to the input section; a plurality of second band-pass filters connected to the input section; and a plurality of first detecting means respectively connected to the plurality of first band-pass filters, the plurality of first detecting means each outputting a signal when a power of each of a plurality of first outputs from the plurality of first band-pass filter is higher than a threshold level; a plurality of second detecting means respectively connected to the plurality of second band-pass filters, the plurality of second detecting means each outputting a signal when a power of each of a plurality of second outputs from the plurality of second band-pass filters is higher than a threshold level; and an output section connected to the plurality of first detecting means and the plurality of second detecting means, for outputting a code based on an output state of the plurality of first detecting means and an output state of the plurality of second detecting means. The DTMF signal judging circuit includes first judging means connected to the plurality of first detecting means, for outputting a first judgment signal based on the output state of the plurality of first detecting means; second judging means connected to the second detecting means, for outputting a second judgment signal based on the output state of the plurality of second detecting means; and third judging means for judging whether the input signal is a DTMF signal or not, based on the first judgment signal and the second judgment signal and for permitting the output section to output the code when judging the input signal is a DTMF signal.

Thus, the invention described herein makes possible the advantage of providing a DTMF signal receiving apparatus equipped with a DTMF signal judging circuit for preventing malfunction of a DTMF signal receiver in the apparatus.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating examples with reference to the accompanying drawings. These examples are given by way of illustration only, and thus are not limitative of the present invention.

EXAMPLE 1

Figure 1:
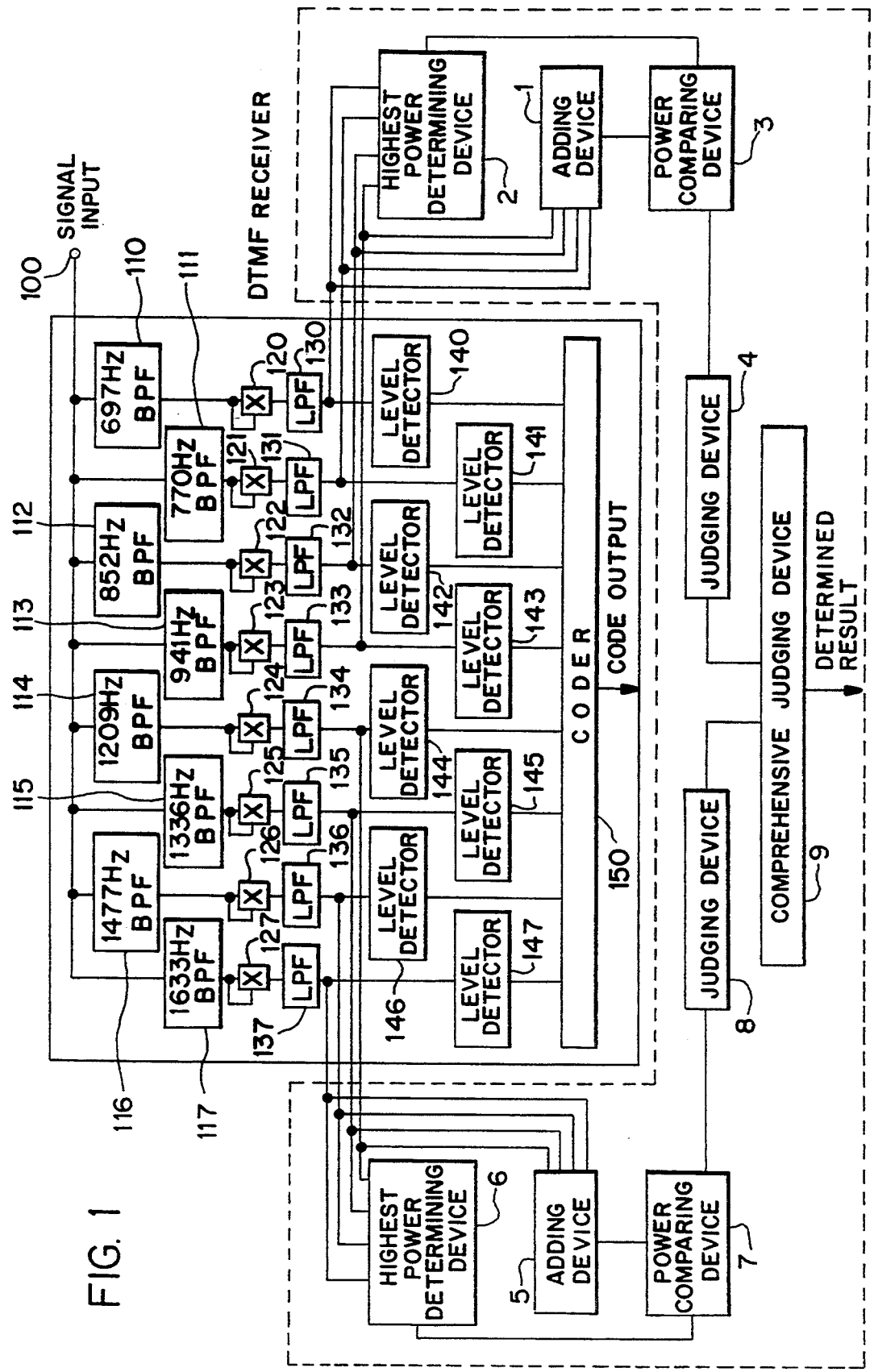
FIG. 1 is a block diagram illustrating a configuration of a DTMF signal receiving apparatus equipped with a DTMF signal judging circuit according to a first example of the present invention.

FIG. 1 is a block diagram showing a configuration of a DTMF signal receiving apparatus equipped with a DTMF signal judging circuit according to a first example of the present invention.

The DTMF signal receiver has a similar configuration to that of a conventional DTMF signal receiver. Practically, the DTMF signal receiver includes eight band-pass filters 110 to 117 which are all connected to an input terminal 100. The band-pass filters 110 to 117 correspond to the eight tones, respectively. The frequency of each of the eight tones corresponds to a center frequency of the corresponding band-pass filter. In this and the following examples, the band-pass filters 110 to 113 are used for a low frequency band, and the band-pass filters 114 to 117 are used for a high frequency band.

The band-pass filters 110 to 117 are connected to multipliers 120 to 127, respectively, for squaring outputs from the band-pass filters 110 to 117. The multipliers 120 to 127 are connected to smoothing low-pass filters 130 to 137 for smoothing outputs from the multipliers 120 to 127. The smoothing low-pass filters 130 to 137 are connected to level detectors 140 to 147 for detecting power levels of outputs from the smoothing low-pass filters 130 to 137. The level detectors 140 to 147 are all connected to a coder 150 for outputting a code which corresponds to DTMF signals based on outputs from the level detectors 140 to 147.

The DTMF signal receiver having the above-described configuration is connected to a DTMF signal judging circuit according to the first example of the present invention. A configuration of the DTMF signal judging circuit according to the first example of the present invention will be described.

An adding device 1 is connected to an output side of each of the low-pass filters 130 to 133 for the low frequency band so as to obtain a total power by adding all the powers of outputs therefrom. A highest power determining device 2 is also connected to the output side of each of the low-pass filters 130 to 133 so as to determine a highest power among the powers of the outputs therefrom. A power comparing device 3 is connected to both the adding device 1 and the highest power determining device 2 so as to determine a difference between the total power and the highest power. A judging device 4 is connected to the power comparing device 3 so as to compare the difference and a predetermined threshold level.

Further, an adding device 5 is connected to an output side of each of the low-pass filters 134 to 137 for the high frequency band so as to obtain a total power by adding all the powers of outputs therefrom. A highest power determining device 6 is also connected to the output side of each of the low-pass filters 134 to 137 so as to determine a highest power among the powers of the outputs therefrom. A power comparing device 7 is connected to both the adding device 5 and the highest power determining device 6 so as to obtain a difference between the total power and the highest power. A judging device 8 is connected to the power comparing device 7 so as to compare the difference and a predetermined threshold level.

The judging devices 4 and 8 are both connected to a comprehensive judging device 9 for judging whether a DTMF signal has been inputted or not, based on outputs from the judging devices 4 and 8. The power comparing devices 3 and 7 are each constituted by, for example, an A/D converter, a microcomputer and a D/A converter.

The DTMF signal judging circuit having the above-described configuration is operated in the following manner.

When a signal is inputted into the DTMF signal receiver through the input terminal 100, the four frequency components of the signal which belong to the low frequency band are extracted by the band-pass filters 110 to 113, respectively, and the four frequency components of the signal which belong to the high frequency band are extracted by the band-pass filters 114 to 117, respectively. Then, the outputs from the band-pass filters 110 to 117 are squared by the multipliers 120 to 127, respectively, and inputted into the coder 150 through the smoothing low-pass filters 130 to 137 and the level detectors 140 to 147.

The outputs from the smoothing low-pass filters 130 to 137 are also sent to the DTMF signal judging circuit. In more detail, the outputs from the smoothing low-pass filters 130 to 133 for the low frequency band are sent to both the adding device 1 and the highest power determining device 2. The outputs from the smoothing low-pass filters 134 to 137 for the high frequency band are sent to both the adding device 5 and the highest power determining device 6.

The adding device 1 adds the outputs from the smoothing low-pass filters 130 to 133 together and sends a total power of the outputs to the power comparing device 3. The highest power determining device 2 determines a highest power among the powers of the outputs from the smoothing low-pass filters 130 to 133 and sends the highest power to the power comparing device 3.

The adding device 5 adds the outputs from the smoothing low-pass filters 134 to 137 together and sends a total power of the outputs to the power comparing device 3. The highest power determining device 6 determines a highest power among the powers of the outputs from the smoothing low-pass filters 134 to 137 and sends the highest power to the power comparing device 7.

The power comparing device 3 determines a difference between the total power and the highest power. The difference is obtained by, for example, subtracting the highest power from the total power. The resultant difference is inputted into the judging device 4. In the judging device 4, a certain threshold level is set in advance. The threshold level is determined in consideration of noise detection characteristics of the DTMF signal receiver. Practically, the threshold level is obtained by actual measurement in a state, for example, where the S/N ratio which indicates receiving performance of the DTMF signal receiver is 10 dB, the DTMF signal level is 0 dBm, and the noise level is −10 dBm.

The judging device 4 compares the difference inputted from the power comparing device 3 with the threshold level. If the difference is equal to or lower than the threshold level, "1" is inputted into the comprehensive judging device 9. If the difference is higher than the threshold level, "0" is inputted into the comprehensive judging device 9.

The power comparing device 7 determines a difference between the total power and the highest power. The difference is obtained by, for example, subtracting the highest power from the total power. The resultant difference is inputted into the judging device 8. In the judging device 8, a certain threshold level is set in advance. The threshold level is determined in a similar manner as mentioned above.

The judging device 8 compares the difference inputted from the power comparing device 7 with the threshold level. If the difference is equal to or lower than the threshold level, "1" is inputted into the comprehensive judging device 9. If the difference is higher than the threshold level, "0" is inputted into the comprehensive judging device 9.

The comprehensive judging device 9 judges that a DTMF signal is inputted only when both of the outputs from the judging devices 4 and 8 are "1".

As is mentioned above, a DTMF signal includes one frequency component in the low frequency band and one frequency component in the high frequency band. By contrast, an audio signal or white noise includes a plurality of frequency components in the low frequency band and a plurality of frequency components in the high frequency band. Accordingly, if the signal inputted into the DTMF signal receiver is a DTMF signal, the difference between the total power and the highest power is almost zero. If not, the difference is larger.

In other words, if a DTMF signal has been inputted, both of the outputs from the judging devices 4 and 8 are "1". If an audio signal or white noise has been inputted instead of a DTMF signal, both or one of the outputs from the judging devices 4 and 8 is "0".

Accordingly, the comprehensive judging device 9 reliably judges if a DTMF signal has been inputted or not. Even when a signal other than a DTMF signal has been inputted and thus the coder 150 is in a state for outputting a code based on outputs from the level detectors 140 to 147, such an operation of the coder 150 can be stopped, thereby prohibiting malfunction.

In the first example, a value obtained by subtracting the highest power from the total power is compared with the threshold level. Alternatively, a value obtained by subtracting the total power from the highest power may be compared with the threshold level. The ratio of the total power with respect to the highest power or the ratio of the highest power with respect to the total power may be compared with the threshold level.

EXAMPLE 2

Figure 2:
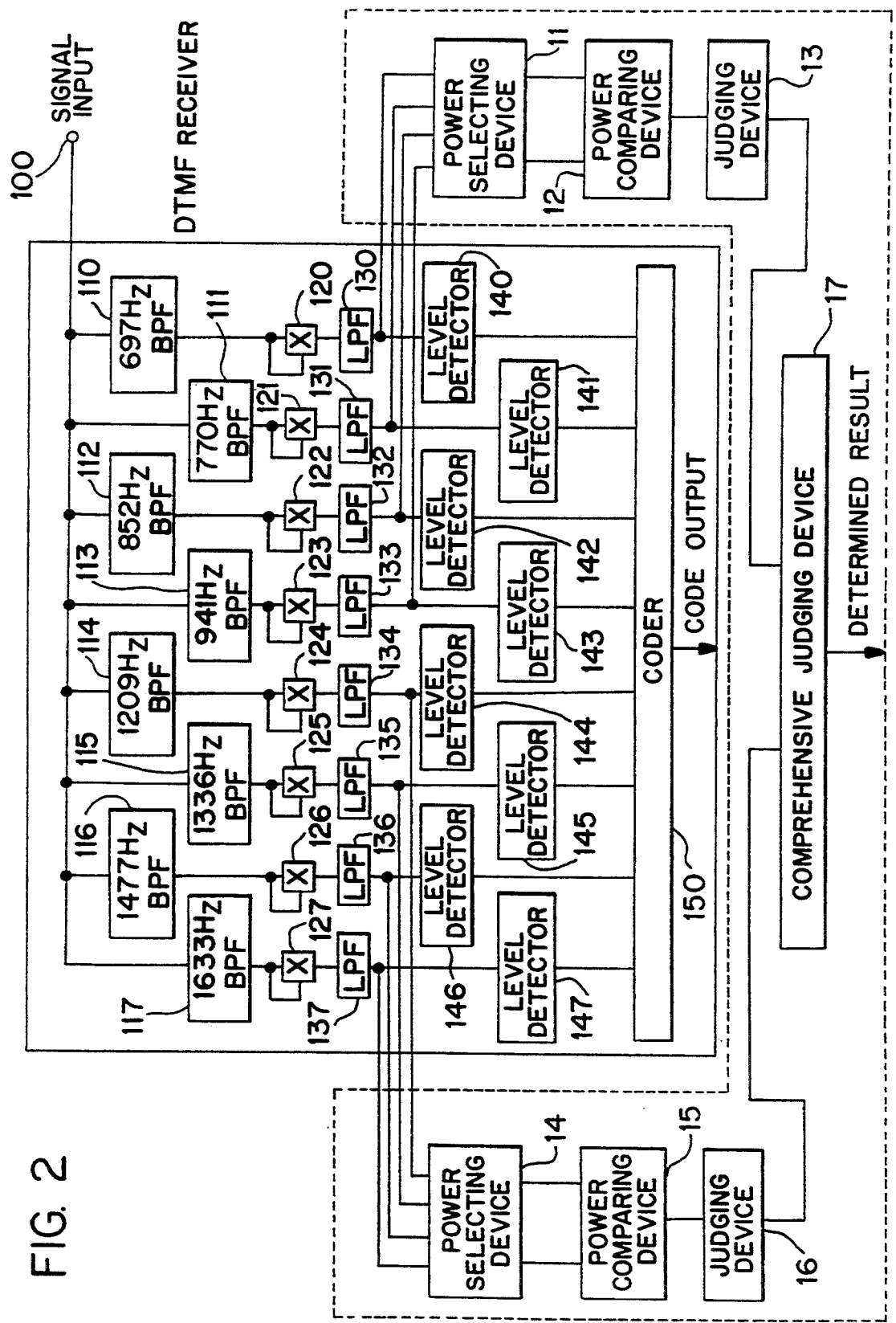
FIG. 2 is a block diagram illustrating a configuration of a DTMF signal receiving apparatus equipped with a DTMF signal judging circuit according to a second example of the present invention.

FIG. 2 is a block diagram showing a configuration of a DTMF signal receiving apparatus equipped with a DTMF signal judging circuit according to a second example of the present invention. The DTMF signal receiver has the same configuration as that in the first example.

A configuration of the DTMF signal judging circuit according to the second example will be described.

A power selecting device 11 is connected to the output side of each of the smoothing low-pass filters 130 to 133 for the low frequency band so as to select a highest power and a second highest power among the powers of the outputs from the smoothing low-pass filters 130 to 133. The power selecting device 11 is connected to a comprehensive judging device 17 through a power comparing device 12 and a judging device 13.

Similarly, a power selecting device 14 is connected to the output side of each of the smoothing low-pass filters 134 to 137 for the high frequency band so as to select a highest power and a second highest power among the powers of the outputs from the smoothing low-pass filters 134 to 137. The power selecting device 14 is connected to the comprehensive judging device 17 through a power comparing device 15 and a judging device 16.

The DTMF signal judging circuit according to the second example is operated in the following manner.

Among the powers of the outputs sent to the power selecting device 11 from the smoothing low-pass filters 130 to 133 for the low frequency band, a highest power and a second highest power are selected. These two powers are sent to the power comparing device 12. The power comparing device 12 determines a difference between the two powers. The difference is obtained by, for example, subtracting the second highest power from the highest power. The resultant difference is inputted into the judging device 13. In the judging device 13, a certain threshold level is set in advance. The threshold level is determined in consideration of noise detection characteristics of the DTMF signal receiver. Practically, the threshold level is obtained by actual measurement in a state, for example, where the S/N ratio which indicates receiving performance of the DTMF signal receiver is 10 dB, the DTMF signal level is 0 dBm, and the noise level is −10 dBm.

The judging device 13 compares the difference inputted from the power comparing device 12 with the threshold level. If the difference is equal to or higher than the threshold level, "1" is inputted into the comprehensive judging device 17. If the difference is lower than the threshold level, "0" is inputted into the comprehensive judging device 17.

Among the powers of the outputs sent to the power selecting device 14 from the smoothing low-pass filters 134 to 137 for the high frequency band, a highest power and a second highest power are selected. These two powers are sent to the power comparing device 15. The power comparing device 15 determines a difference between the two powers. The difference is obtained by, for example, subtracting the second highest power from the highest power. The resultant difference is inputted into the judging device 16. In the judging device 16, a certain threshold level is set in advance. The threshold level is determined in the above-mentioned manner.

The judging device 16 compares the difference inputted from the power comparing device 15 with the threshold level. If the difference is equal to or higher than the threshold level, "1" is inputted into the comprehensive judging device 17. If the difference is lower than the threshold level, "0" is inputted into the comprehensive judging device 17.

The comprehensive judging device 17 judges that a DTMF signal is inputted only when both of the outputs from the judging devices 13 and 16 are "1".

As is mentioned above, a DTMF signal includes one frequency component in the low frequency band and one frequency component in the high frequency band. By contrast, an audio signal or white noise includes a plurality of frequency components in the low frequency band and a plurality of frequency components in the high frequency band. Accordingly, if the signal inputted into the DTMF signal receiver is a DTMF signal, the difference between the highest power and the second highest power is almost zero. If not, the difference is larger.

In other words, if a DTMF signal has been inputted, both of the outputs from the judging devices 13 and 16 are "1". If an audio signal or white noise is inputted instead of a DTMF signal, both or one of the outputs from the judging devices 13 and 16 is "0".

Accordingly, the comprehensive judging device 17 reliably judges if a DTMF signal has been inputted or not. Even when a signal other than a DTMF signal has been inputted and thus the coder 150 is in a state for outputting a code based on outputs from the level detectors 140 to 147, such an operation of the coder 150 can be stopped, thereby prohibiting malfunctions.

In the second example, a value obtained by subtracting the second highest power from the highest power is compared with the threshold level. Alternatively, a value obtained by subtracting the highest power from the second highest power may be compared with the threshold level. The ratio of the highest power with respect to the second highest power or the ratio of the second highest power with respect to the highest power may be compared with the threshold level.

EXAMPLE 3

Figure 3:
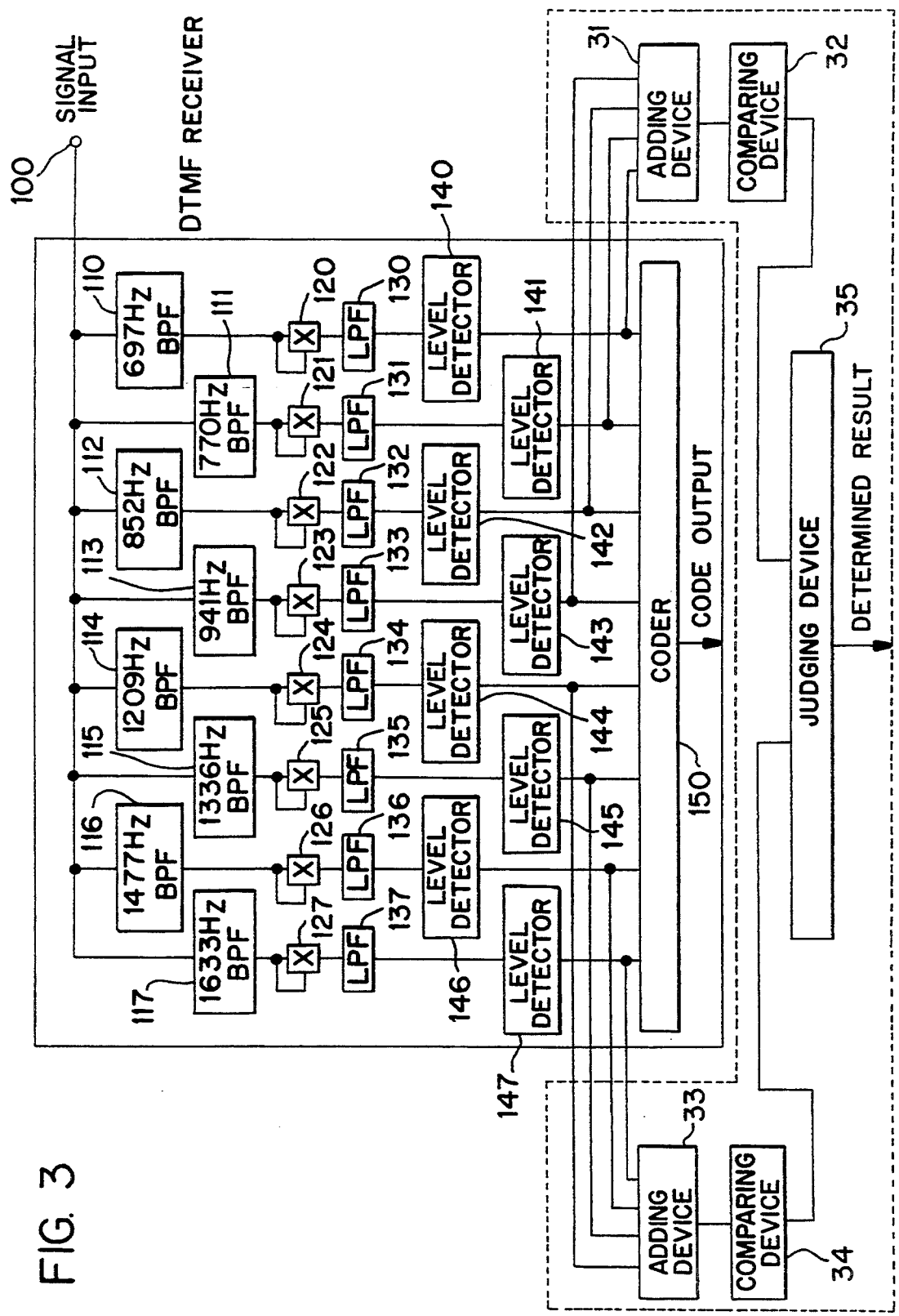
FIG. 3 is a block diagram illustrating a configuration of a DTMF signal receiving apparatus equipped with a DTMF signal judging circuit according to a third example of the present invention.
Figure 4:
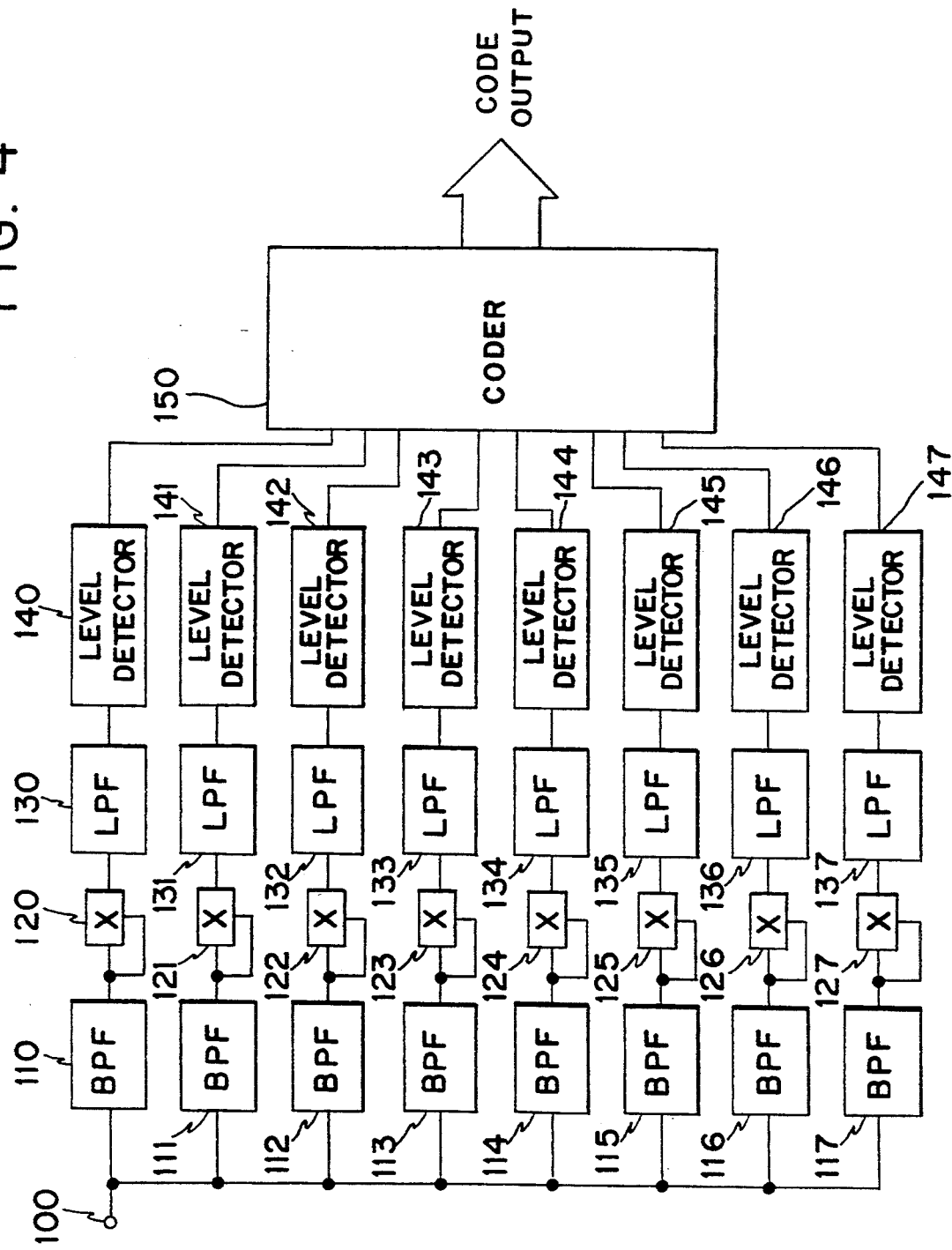
FIG. 4 is a block diagram of a conventional DTMF signal receiver.

FIG. 3 is a block diagram showing a configuration of a DTMF signal receiving apparatus equipped with a DTMF signal judging circuit according to a third example of the present invention. The DTMF signal receiver has the same configuration as that in the second example.

The DTMF signal judging circuit according to the third example is connected to an output side of each of the level detectors 140 to 147. In more detail, an adding device 31 is connected to each of the level detectors 140 to 143 for the low frequency band, and a comparing device 32 is connected to the adding device 31. An adding device 33 is connected to each of the level detectors 144 to 147 for the high frequency band, and a comparing device 34 is connected to the adding device 33. The comparing devices 32 and 34 are both connected to a judging device 35. The adding device 31 and the comparing device 32 constitute a level counter. The adding device 33 and the comparing device 34 constitute another level counter.

The DTMF signal judging circuit according to the third example is operated in the following manner.

Outputs from the level detectors 140 to 143 for the low frequency band are sent to the adding device 31. The adding device 31 determines the number of frequency components having a power exceeding a certain threshold level among the frequency components from the level detectors 140 to 143. Then, the number is sent to the comparing device 32. In the comparing device 32, data "1" indicating that there is only one low frequency component which constitutes a DTMF signal is set as data for comparison. The comparing device 32 judges whether the number from the adding device 31 is equal to "1" or not. If the number from the adding device 31 is equal to "1", "1" is inputted into the judging device 35. If not, "0" is inputted into the judging device 35.

Similarly, outputs from the level detectors 144 to 147 for the high frequency band are sent to the adding device 33. The adding device 33 determines the number of frequency components having a power exceeding a certain threshold level from the level detectors 144 to 147. Then, the number is sent to the comparing device 34. In the comparing device 34, data "1" indicating that there is only one high frequency component which constitutes a DTMF signal is set as data for comparison. The comparing device 34 judges whether the number from the adding device 33 is equal to "1" or not. If the number from the adding device 33 is equal to "1", "1" is inputted into the judging device 35. If not, "0" is inputted into the judging device 35.

The judging device 35 judges that a DTMF signal has been inputted only when both of the outputs from the comparing devices 32 and 34 are "1".

As is mentioned above, a DTMF signal includes one frequency component in the low frequency band and one frequency component in the high frequency band. By contrast, an audio signal or white noise includes a plurality of frequency components in the low frequency band and a plurality of frequency components in the high frequency band. Accordingly, if the signal inputted into the DTMF signal receiver is a DTMF signal, only one frequency component in the low frequency band and only one frequency component in the high frequency band are counted by the level counters. If not, more than one frequency component in the low frequency band and more than one frequency component in the high frequency band are counted.

In other words, if a DTMF signal has been inputted, both of the outputs from the comparing devices 32 and 34 are "1". If an audio signal or white noise has been inputted instead of a DTMF signal, both or one of the outputs from the comparing devices 32 and 34 is "0".

Accordingly, the judging device 35 reliably judges if a DTMF signal is inputted or not. Even when a signal other than a DTMF signal has been inputted and thus the coder 150 is in a state for outputting a code based on outputs from the level detectors 140 to 147, such an operation of the coder 150 can be stopped, thereby prohibiting malfunctions.

As has been described so far, according to the present invention, a DTMF signal judging circuit prevents malfunction of a DTMF signal receiver connected thereto. Thus, the antinoise property and the audio signal blocking property of the DTMF signal receiver can be significantly improved. For example, when a DTMF signal is sent to a telephone or a controller at home, from a public phone or other devices exposed to noise for controlling such a device, it is not necessary to cover the transmitter to avoid ambient noise in order to prevent malfunctions.

In a device having a DTMF control function which is connected to a line exposed to a high noise level such as an international line or a private line, a DTMF signal receiving apparatus equipped with a DTMF signal judging circuit according to the present invention allows a DTMF signal to be received normally, without necessity of a special arrangement for reducing noise.

Variations and other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed. Any such variations should not be regarded as a departure from the spirit and scope of the invention, and all such modifications as would be obvious to one skilled in the art are intended to be included within the scope of the following claims.

What is claimed is:

1. A DTMF signal receiving apparatus, comprising:
    a DTMF signal receiver having an input section for receiving an input signal from an external apparatus,
    a plurality of first band-pass filters connected to the input section,
    a plurality of second band-pass filters connected to the input section, and
    an output section connected to the plurality of the first band-pass filters and the plurality of the second band-pass filters, for outputting a code based on a plurality of outputs from the plurality of the first band-pass filters and the plurality of the second band-pass filters; and
    a DTMF signal judging circuit having first judging means connected to the plurality of the first band-pass filters, for outputting a first judgment signal based on a plurality of first outputs from the plurality of the first band-pass filters,
    second judging means connected to the plurality of the second band-pass filters, for outputting a second judgment signal based on a plurality of second outputs from the plurality of the second band-pass filters, and
    third judging means for judging whether the input signal is a DTMF signal or not, based on the first judgment signal and the second judgment signal and for permitting the output section to output the code when judging that the input signal is a DTMF signal.

2. A DTMF signal receiving apparatus according to claim 1, wherein,
    the first judging means comprises:
    a first adding device for obtaining a sum of powers of the plurality of the first outputs;
    a first determining device for determining a highest power among the powers of the plurality of the first outputs; and
    a first judging device for outputting the first judgment signal based on a comparison between the sum obtained by the first adding device and the highest power determined by the first determining device,
    and the second judging means comprises:
    a second adding device for obtaining a sum of powers of the plurality of the second outputs;
    a second determining device for determining a highest power among the powers of the plurality of the second outputs; and
    a second judging device for outputting the second judgment signal based on a comparison between the sum obtained by the second adding device and the highest power determined by the second determining device.

3. A DTMF signal receiving apparatus according to claim 2, wherein,
    the first judging means outputs the first judgment signal based on a comparison between a predetermined value and a difference between the sum obtained by the first adding device and the highest power determined by the first determining device; and
    the second judging means outputs the second judgment signal based on a comparison between a predetermined value and a difference between the sum obtained by the second adding device and the highest power determined by the second determining device.

4. A DTMF signal receiving apparatus according to claim 2, wherein,
    the first judging means outputs the first judgment signal based on a comparison between a predetermined value and a ratio between the sum obtained by the first adding device and the highest power determined by the first determining device; and
    the second judging means outputs the second judgment signal based on a comparison between a predetermined value and a ratio between the sum obtained by the second adding device and the highest power determined by the second determining device.

5. A DTMF signal receiving apparatus according to claim 1, wherein,
    the first judging means comprises:
    a first determining device for determining a highest power and a second highest power among powers of the plurality of the first outputs; and
    a first judging device for outputting the first judgment signal based on a comparison between the highest power and the second highest power determined by the first determining device,
    and the second judging means comprises:
    a second determining device for determining a highest power and a second highest power among powers of the plurality of the second outputs; and
    a second judging device for outputting the second judgment signal based on a comparison between the highest power and the second highest power determined by the second determining device.

6. A DTMF signal receiving apparatus according to claim 5, wherein,
    the first judging means outputs the first judgment signal based on a comparison between a predetermined value and a difference between the highest power and the second highest power determined by the first determining device; and
    the second judging means outputs the second judgment signal based on a comparison between a predetermined value and a difference between the highest power and the second highest power determined by the second determining device.

7. A DTMF signal receiving apparatus according to claim 5, wherein, the first judging means outputs the first judgment signal based on a comparison between a predetermined value and a ratio between the highest power and the second highest power determined by the first determining device; and the second judging means outputs the second judgment signal based on a comparison between a predetermined value and a ratio between the highest power and the second highest power determined by the second determining device.

8. A DTMF signal receiving apparatus, comprising:
a DTMF signal receiver having an input section for receiving an input signal from an external apparatus,
a plurality of first band-pass filters connected to the input section,
a plurality of second band-pass filters connected to the input section,
a plurality of first detecting means respectively connected to the plurality of the first band-pass filters, the plurality of the first detecting means each outputting a signal when a power of each of a plurality of first outputs from the plurality of the first band-pass filters is higher than a threshold level,
a plurality of second detecting means respectively connected to the plurality of the second band-pass filters, the plurality of the second detecting means each outputting a signal when a power of each of a plurality of second outputs from the plurality of the second band-pass filters is higher than a threshold level, and an output section connected to the plurality of the first detecting means and the plurality of the second detecting means, for outputting a code based on an output state of the plurality of the first detecting means and an output state of the plurality of the second detecting means; and a DTMF signal judging circuit having first judging means connected to the plurality of the first detecting means, for outputting a first judgment signal based on the output state of the plurality of the first detecting means, second judging means connected to the second detecting means, for outputting a second judgment signal based on the output state of the plurality of the second detecting means, and third judging means for judging whether the input signal is a DTMF signal or not, based on the first judgment signal and the second judgment signal and for permitting the output section to output the code when judging the input signal is a DTMF signal.

9. A DTMF signal receiving apparatus according to claim 8, wherein, the first judging means outputs the first judgment signal when a number of the signals outputted by the first detecting means is one;

the second judging means outputs the second judgment signal when a number of the signals outputted by the second detecting means is one; and the third judging means outputs the code when receiving both of the first judgment signal and the second judgment signal.

* * * * *